US010497038B2

(12) United States Patent
Stevenson et al.

(10) Patent No.: US 10,497,038 B2
(45) Date of Patent: Dec. 3, 2019

(54) VIRTUAL TREE SYSTEM AND METHOD

(71) Applicants: Ryan Alexander Stevenson, London (GB); Olaf Kroeger, Hove (GB)

(72) Inventors: Ryan Alexander Stevenson, London (GB); Olaf Kroeger, Hove (GB)

(*) Notice: Subject to any disclaimer, the term of this patent is extended or adjusted under 35 U.S.C. 154(b) by 1317 days.

(21) Appl. No.: 14/320,040

(22) Filed: Jun. 30, 2014

(65) Prior Publication Data

US 2015/0012370 A1 Jan. 8, 2015

Related U.S. Application Data

(60) Provisional application No. 61/842,129, filed on Jul. 2, 2013.

(51) Int. Cl.
*G06Q 30/00* (2012.01)
*G06Q 30/06* (2012.01)
*G06Q 50/02* (2012.01)
*G06Q 50/00* (2012.01)
*G06Q 30/02* (2012.01)

(52) U.S. Cl.
CPC ......... *G06Q 30/0623* (2013.01); *G06Q 30/00* (2013.01); *G06Q 30/0277* (2013.01); *G06Q 30/0601* (2013.01); *G06Q 30/0611* (2013.01); *G06Q 50/01* (2013.01); *G06Q 50/02* (2013.01)

(58) Field of Classification Search
CPC ........ G06Q 50/01; G06Q 50/02; G06Q 30/00; G06Q 30/0601; G06Q 30/0611
See application file for complete search history.

(56) References Cited

U.S. PATENT DOCUMENTS

| 2006/0224327 | A1* | 10/2006 | Dunlap | ............... G06Q 30/02 702/19 |
| 2009/0019366 | A1* | 1/2009 | Abhyanker | ........... G06F 3/0481 715/706 |
| 2010/0145743 | A1* | 6/2010 | Colquhoun | ............ G06Q 10/02 705/5 |

(Continued)

OTHER PUBLICATIONS

National Forest Foundation—Contribute, dated Jan. 21, 2012, downloaded from https://web.archive.org/web/20120121201258/https://app.etapestry.com/hosted/NationalForestFoundation/PlantTrees.html on Jan. 26, 2018 (hereinafter Forest Contribution Page) (Year: 2012).*

(Continued)

*Primary Examiner* — Scott D Gartland
*Assistant Examiner* — Jonathan J Whitaker

(57) ABSTRACT

A website ("Teratrees") is described where a person can upload pictures of trees or shrubs which they have recently planted and have them displayed in their personal profile. Validation of the tree is obtained by a voucher code that is entered into the website. Once the tree has been uploaded to the website it appears in the 'Planted Trees' section and can be offered to the Market at a price set by the planter. Another user can then purchase (using a virtual currency with real financial value) this tree from the Market and own it—whereupon it appears in their profile under 'Owned Trees'. This is virtual ownership within the context of the website. The user who owns this tree can offer the tree again on the Market if desired, while further transactions are also possible. Users who plant and own trees are rewarded with points and ranking.

5 Claims, 10 Drawing Sheets

(56) References Cited

U.S. PATENT DOCUMENTS

| | | | | |
|---|---|---|---|---|
| 2011/0093321 | A1* | 4/2011 | Streetman | G06Q 30/0214 705/14.16 |
| 2013/0174040 | A1* | 7/2013 | Johnson | G06Q 10/06 715/733 |
| 2014/0067704 | A1* | 3/2014 | Abhyanker | G06Q 10/1053 705/321 |
| 2014/0089125 | A1* | 3/2014 | Kinnersley | G06Q 50/01 705/26.3 |
| 2014/0149301 | A1* | 5/2014 | Dickinson | G06Q 10/00 705/319 |

OTHER PUBLICATIONS

Tree Planting Program Brochure—National Forest Foundation, dated Oct. 25, 2013, downloaded from https://web.archive.org/web/20131025235625/http://www.nationalforests.org/files/dynamic/content_media_documents/60/Tree-planting%20brochure.pdf on Jan. 26, 2018 (hereinafter Tree Planting Brochure) (Year: 2013).*

National Forest Foundation—Tree Planting in Our National Forests, dated Jan. 2, 2012, downloaded from https://web.archive.org/web/20120102051142/http://www.nationalforests.org:80/conserve/treeplanting on Jan. 26, 2018 (hereinafter Forest Tree Planting) (Year: 2012).*

Benefits of Reforestation—National Forest Foundation, published Nov. 17, 2017, downloaded from https://www.nationalforests.org/get-involved/tree-planting-programs/benefits-of-reforestation on Jan. 26, 2018 (hereinafter Benefits of Reforestation) (Year: 2017).*

Swaffar, Wes, From Seed to Tree: How We Restore Forests—National Forest Foundation, dated Aug. 9, 2017, downloaded from https://www.nationalforests.org/blog/from-seed-to-tree-how-we-restore-forests on Jan. 26, 2018 (hereinafter Seed to Tree) (Year: 2017).*

Corporate Tree-Planting Program—National Forest Foundation, dated Mar. 23, 2012, downloaded from https://web.archive.org/web/20120323030550/http://www.nationalforests.org/conserve/treeplanting/corporate-program on Jan. 26, 2018 (hereinafter Forest Corporate Tree-Planting) (Year: 2012).*

NFF Trees for US Overview, dated May 13, 2014, downloaded from https://web.archive.org/web/20140513205246/http://www.nationalforests.org:80/files/dynamic/content_media_documents/22/NFF%20Trees%20for%20USOverview.pdf on Jan. 26, 2018 (hereinafter Trees for Us Overview) (Year: 2014).*

National Forest Foundation, "Tree-Planting Campaign", Aug. 1, 2019, nationalforests.org, "https://www.nationalforests.org/get-involved/tree-planting-programs" (Year: 2019).*

One Tree Planted, "About Us We Are One Tree Planted", Aug. 1, 2019 onetreeplanted.org, "https://onetreeplanted.org/pages/about-us#how" (Year: 2019).*

Nori, "Nori: A blockchain-based marketplace for removing carbon dioxide from the atmosphere", Feb. 18, 2019, nori.com, "https://nori.com/resources/white-paper" (Year: 2019).*

McHale, Melissa R., "The potential of urban tree plantings to be cost effective in carbon credit markets", Jan. 18, 2007, ScienceDirect.com, "https://www.sciencedirect.com/science/article/pii/S1618866707000118" (Year: 2007).*

* cited by examiner

VIRTUAL TREE SYSTEM AND METHOD

CROSS REFERENCE TO RELATED APPLICATIONS

This application claims the benefit of U.S. Provisional Application No. 61/842,129 filed Jul. 2, 2013.

FIELD OF THE INVENTION

The present invention relates to a virtual tree system and method.

BACKGROUND OF THE INVENTION

An existing website, www.tree-nation.com, allows a user to buy a tree that will form part of a plantation in a foreign country, and that tree will be represented by an animated image in the user's personal profile. It is therefore known to permit people to buy trees that are not in their garden. People are also able to donate to charitable organisations such as http://www.worldlandtrust.org under the pretext of buying an acre of tropical forest (without legal ownership) and to receive a certificate. These sites represent one-way traffic of a buyer making a purchase or donation and the 'tree' or certificate is not tradable.

Thus provided there is a means of communicating the desire to plant a tree and to virtually own such a tree, tree planting and virtual tree ownership could be opened up to everyone and not just limited to a singular tree planting organisation receiving funds from the public. This opportunity would also allow tree planting to be done over many locations, urban and rural, and allow companies who virtually own trees to expand their brand and fix carbon as part of corporate responsibility.

SUMMARY OF THE INVENTION

Embodiments of the present invention provide a website (Teratrees) where a person can upload pictures of trees or shrubs which they have purchased from a nursery and recently planted and have them displayed in their personal profile. Proof of the purchase is obtained by a voucher code that is entered into the website—vouchers are provided by the nursery upon purchasing of a tree. Alternatively, trees can also be uploaded to the website if vouchers have been directly supplied to the planter from Teratrees Ltd in cases where the planter has been able to source their own trees and have had them recently planted. Once the tree (singular or multiples thereof) has been uploaded to the website it appears in a 'Planted Trees' section and can be offered to a virtual tree market (the Market) at a price set by the planter. Another user can then purchase (using a virtual currency with real financial value) this tree from the Market and own it—whereupon it appears in their profile under 'Owned Trees'. This is virtual ownership within the context of the website. The user who owns this tree can offer the tree again on the Market if desired. Other Market transactions are also possible, such as placing a bid for a tree that a user would like to own, as well as offering a tree on the Market that has yet to be planted (Reverse Sale). The trees owned and planted are assigned points and this score appears on the user's profile. Trees and nurseries can be searched for using a TreeFinder tool.

The aim of Teratrees is to promote tree planting as well as the creation of an online nature community. Planting of trees through the website, and the associated recognition, also helps facilitate companies offsetting carbon, expanding their brand and satisfying corporate sustainability reporting. Real trees are planted, but are virtually owned via real transactions. This is an ownership within the context of the website and is not a physical or legal ownership. The Teratrees Market is intended to promote the trading and resulting planting of trees. The Market is made up of several unique transactions as mentioned above. The invention is intended to produce the useful and tangible result of more trees being planted. The Market offers unique types of transactions to provide for the users' needs and desires related to the planting and owning of trees, including the interaction with other users. While the changes in virtual ownership have no impact on the physical tree itself, they do impact on the electronic profiles of the planter, the buyer and the seller (which may or may not be the planter)—and it is this profile modification and the opportunity to make money which incentivises planters to plant trees and other users to buy their virtual tree counterparts.

It will be appreciated that, while the term "trees" is used in the present application, the invention is not limited to this, and may be used in relation to shrubs or other plants. Trees may be uploaded in singular or multiples thereof, but in the description herein the singular will be referred to for ease of understanding the associated transactions, while not limiting the interpretation to the singular.

BRIEF DESCRIPTION OF THE DRAWINGS

Embodiments of the present invention will now be described with reference to the following drawings, in which.

DETAILED DESCRIPTION OF THE EXAMPLE EMBODIMENTS

The Teratrees website provides a social networking platform for tree planters and tree enthusiasts in order to bring newly planted trees in their garden, communal or private landscape into the virtual world, to share these with others and exchange virtual ownership of these trees via real financial transactions. The location of the trees associated with a given user is shown on a map on their profile. A knowledge database (Treepedia) is provided as well as search functionality (Treefinder) to find trees or nurseries.

Figure 9:
FIG. 9 schematically illustrates an example of the starting webpage of the social network system in accordance with the present invention.

A starting webpage is schematically illustrated in FIG. 9. A map showing the locations of trees planted and virtually owned via the website is provided on the starting website, along which the top ranking users (by point score), the top ranking owners and the top ranking planters. Live updating of user transactions is also reported. From the starting webpage, a user can access various other parts of the site, which parts will be described in detail below.

Upon purchasing a tree from a nursery or garden center, a person receives a voucher with a unique code. The person can then log in to the Teratrees website, click on 'Plant Tree', upload a picture and the details of their now planted tree in their garden and enter the unique voucher code (to authenticate the fact that they actually own the tree being uploaded). The picture of their tree will then appear in their personal profile, under the section heading of 'Planted Trees'.

The person/planter (the user), can then offer this tree to a market place on the website where it is possible for another user to buy such trees with the virtual currency and 'own' this tree. The virtual currency is based on real money, for example British Pounds, and the context of ownership is only within the Teratrees website i.e. it is not a legal or physical ownership of the tree. For the user who purchased the tree on the market, the tree will appear in their profile under the section heading of 'Owned Trees'.

Further transactions are possible in the market: placing a bid for a tree the user would like to own or placing an offer on the market for a tree that has yet to be planted (the Reverse Sale).

The website provides a method of providing information about trees and looking for nurseries that offer a particular tree. These searches may be narrowed by certain tree characteristics and distance to nurseries based on the user location. The website thereby provides a platform for nurseries to present their inventory and also their services.

Figure 13:
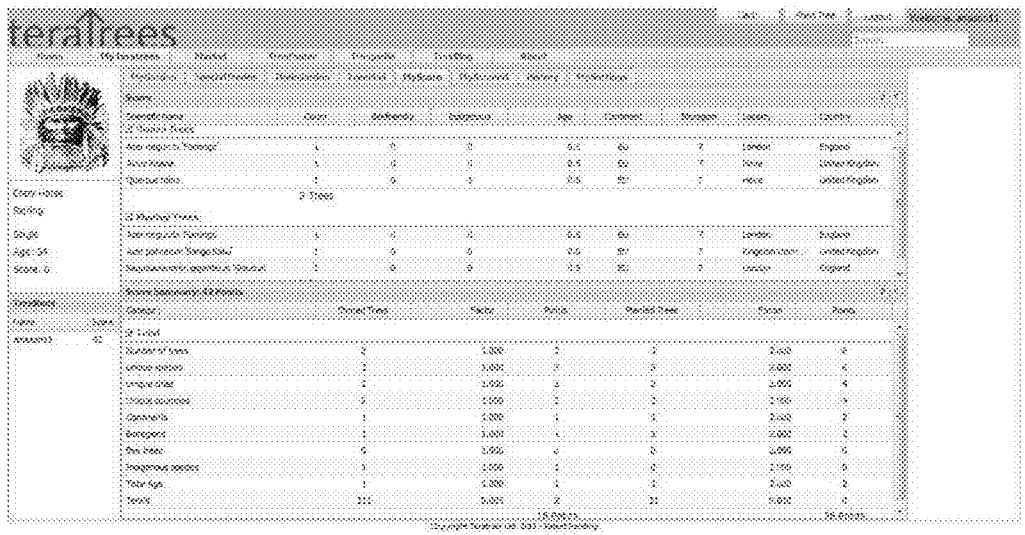
FIG. 13 schematically illustrates an example of the MyScore webpage of the present invention which explains in detail and in summary the current user's score.

The website also provides a scoring system for individuals and organisations based on the number and type of trees planted or owned, and this score is related to a specific ranking. An example webpage demonstrating the scoring system is schematically illustrated in FIG. 13. The scoring page lists the various categories which give rise to points. These include the number of trees (both owned and planted), the number of unique species owned and planted, the number of cities in which you own or have planted trees, the number of countries in which you own or have planted trees, the number of continents in which you own or have planted trees, the number of bioregions in which you own or have planted trees, the number of bee trees owned or planted, the number of indigenous species owned or planted, and the total age of all trees. Additionally, points are awarded for the amount of virtual currency the user has spent owning trees as well as the amount received from their trees being owned by other users. It will be appreciated that the above scoring system is set up to encourage users to plant and own trees in a manner which encourages best practice in tree planting and the greatest possible biodiversity. For each category, the number of planted trees receives a double weighting compared to the number of owned trees in determining the contribution of that category to the overall score.

Key functionality will be listed below in order to provide a context for the operation of the Teratrees Market. The technical implementation of the Market shall then be described.

Summary of Main Processes
Planting a Tree

Figure 10:
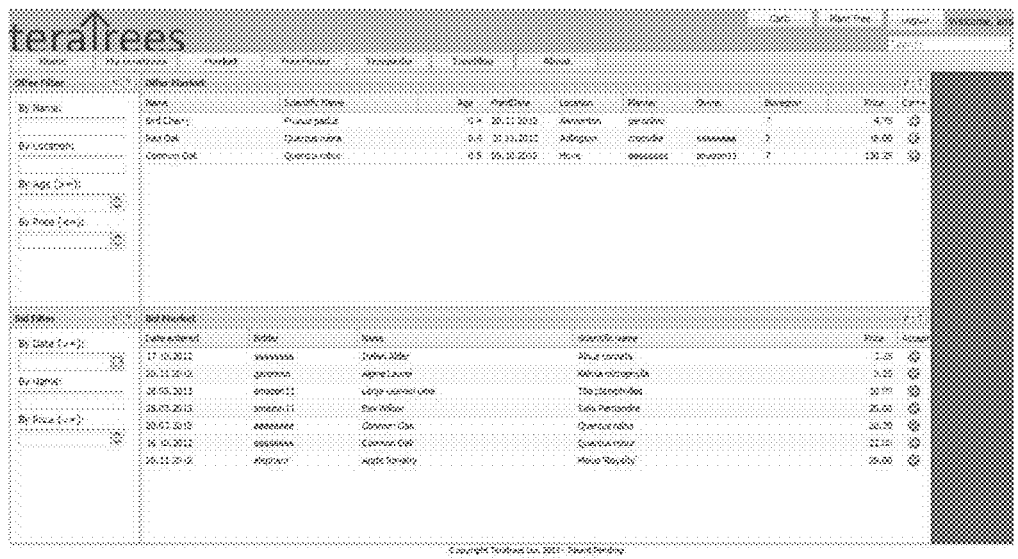
FIG. 10 schematically illustrates an example of a user's garden webpage in accordance with the present invention.

The user clicks a "Plant Tree" button on the website and enters a code from a voucher provided when the user purchased the physical tree. The user then chooses the tree type (or this may be automatically populated based on the voucher code), uploads a picture of the tree, and tree details, and then the tree appears on the personal profile (My Garden) in the section planted Trees for the user. FIG. 10 schematically illustrates an example My Garden page. The My Garden page comprises basic information about the user, a list of owned trees and planted trees (trees which the user planted), as well as a map showing the locations of the owned and planted trees. Various information, such as type, age, date of planting, price, status and location, is also provides in association with each owned and planted tree. Photographs are also provided for each owned and planted tree. Teratrees social contacts may also be listed (TreeBuds).

Figure 11:
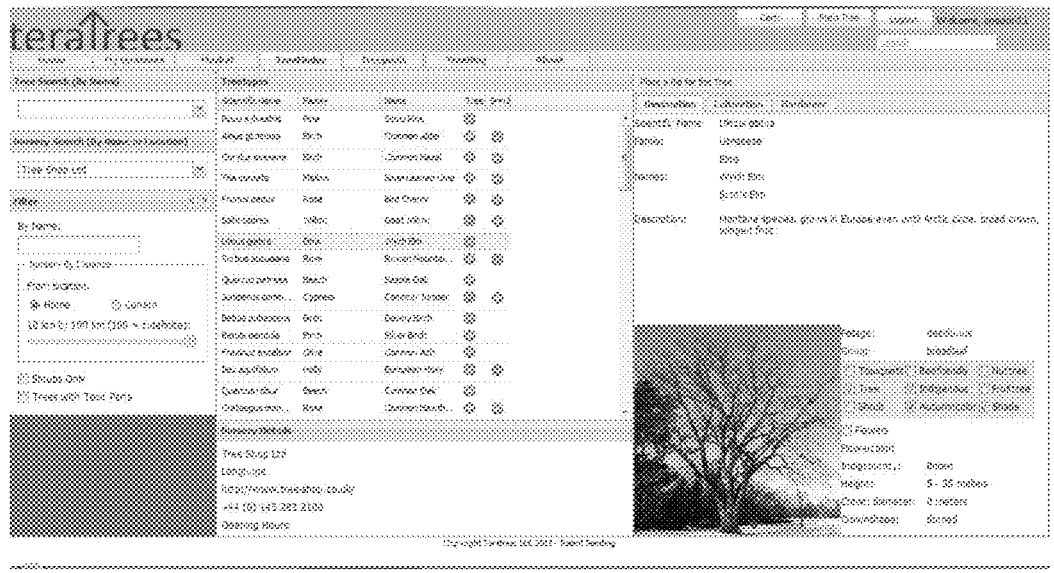
FIG. 11 schematically illustrates an example of treefinder webpage of the present invention where a user can look for certain types of trees or nurseries and their offerings.
Figure 14:
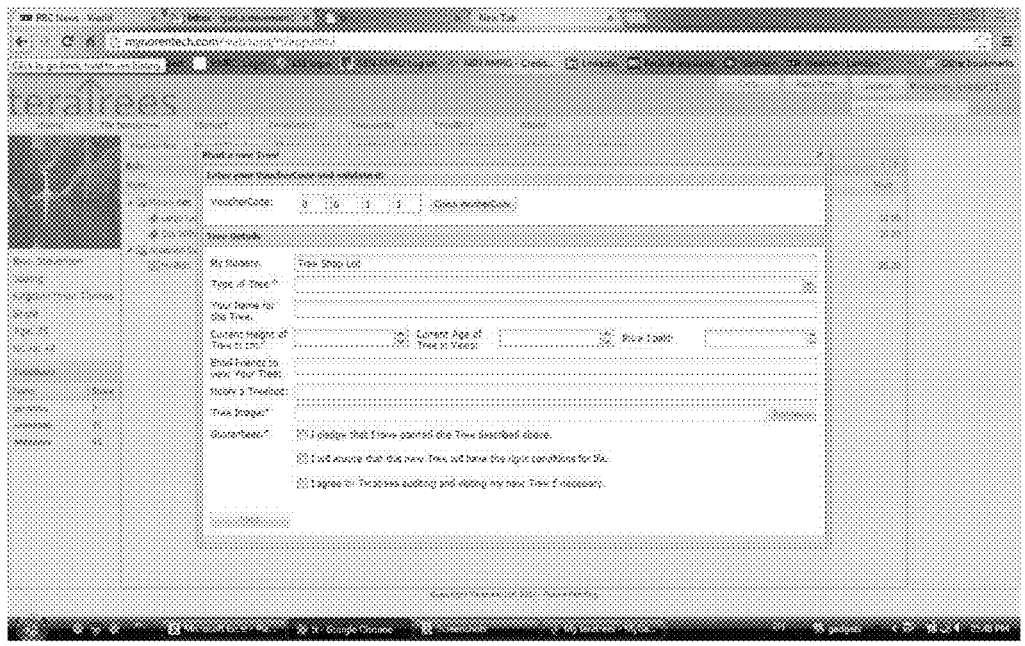
FIG. 14 schematically illustrates an example of the Plant-Tree webpage of the present invention which shows the details of planting (uploading) a newly planted/purchased tree.

The tree planting functionality is shown schematically in FIG. 14, which shows a "Plant tree" window, into which a voucher code and various tree details are to be entered. As can be seen from FIG. 14, such details may include the name of the Planter's nursery, the type of tree planted, a name for the tree, the current height and age of the tree, the price paid for the tree, and a tree image. In addition, an email can automatically be sent to friends to notify them of the planting of the tree, and Teratrees contacts (Treebuds) can also be notified via their own Teratrees page. Guarantees may be provided (check boxes) to provide one or more of (i) a pledge that the user has planted the tree described, (ii) a pledge that the user will ensure that the new tree will have the right conditions for like, and (iii) agreement that the user will permit to Teratrees auditing and visiting the new tree.
Social Network and Communication Users can connect with other users and become Treebuds'. Treebuds have access to each other's virtual gardens and can write messages on their 'Treeboard'. Privacy settings can be adjusted. Messages are received and sent from users and from the Teratrees administration via the TreeMail tab.
TreeFinder A user is able to search by typing in the name of a tree or nursery, and can filter by restrictions such as the distance from the user's current location. Trees can also be filtered by their characteristics. Tree details, cultivation information and hardiness are shown. An example TreeFinder page is schematically illustrated in FIG. 11. As can be seen, this page provides a "Tree Search" function and a "Nursery Search" function (by name or location). Various filters are available, such as to filter by name, or to filter by distance (nursery only). In addition, a search can be specified to include only shrubs, or to include trees with toxic parts. The TreeFinder page presents the results of the search, including information about the search results. For example, the contact details of a found nursery (Tree Shop Ltd) are presented, as is a description of a found treetype (*Ulmus glabra*). The TreeFinder page allows the user to place a bid for a tree type found by the search.

Market (Major Transactions)

i) Adding a tree to the Market: A user clicks on his/her tree in "My Garden", fills in details of the tree and price and clicks to add to Market.

ii) Owning a tree on the Market: A user clicks on a tree in the "Offer Market", and details of the tree are presented to the user. The user is able to then add the tree to cart, and check out. The tree then appears in "My Garden" under Owned Trees.

iii) Adding a Bid to the Market: A user chooses a tree using the TreeFinder, clicks Place a Bid for this Tree, and fills in details. The bid then appears on the Market, and bid details also appear in the "Special Trades" tab of the user's profile.

iv) Accepting a Bid: A user clicks on a bid in the "Bid Market", and accepts the conditions. The bid then appears in the "Accepted Bids" section in the "Special Trades" tab of the user's profile. The user then has a certain amount of time to fulfil conditions (planting the tree). The user uploads the correct tree, receives currency for the purchase, and the tree appears in "My Garden" under "Planted Trees", and appears in another person's (the buyer) "My Garden" under "Owned Trees".

v) Adding a Reverse Sale to Market: A user may choose a tree using the TreeFinder, click 'Offer this Tree', fill in details, and an offer then appears in the "Market".

vi) Accepting a Reverse Sale: A user (the Reverse Sale Purchaser) clicks on a tree in the "Offer Market" with type of 'RS', adds the tree to their cart and checks out, the Reverse Sale Offerer is then notified that they have a certain amount of time to fulfil conditions (planting the tree). The Reverse Sale Offerer then uploads the correct tree, receives currency, and the tree appears in that user's "My Garden" under "Planted Trees", and also appears in the Reverse Sale Purchaser's "My Garden" under "Owned Trees".

Scoring

Each tree may be assigned points according to its type, age and location. There may be different factors for planting vs. owning.

Minor Transactions

When a tree dies: awarding of honesty points to the planter for reporting the death and some points to the owner, it is no longer tradable.

Royalties: every time the tree is resold the planter receives a certain amount of currency.

Topping Up/Cashing Out

Users may top up their virtual currency through a payment gateway and may also have the opportunity to cash out their virtual currency to their real bank account.

Detailed Technical Implementation of the Market and Market Sub-Processes

Coding Approach

This website uses an advanced and efficient coding approach, i.e. the client side is 'intelligent' and has all knowledge about the business and processes. All requests that are sent to the server relate to data requests which minimize data traffic to the absolute minimum. The transformation between the logical data model (as seen from the client side) and the actual/physical data structures in the database system is captured within the server side scripts. This ensures independence and long term stability of all interfaces. The client side is completely realized with HTML5 and Javascript which means the highest possible portability and compatibility with major browsers without usage of any plug-in or local libraries.

Data Logging

This website uses an extensive logging system that tracks all activities of users which allows for detailed analysis of average user behaviour and site usage. Each log entry has a timestamp that enables analysis of activities on a timeline. This valuable data also allows for pro-active optimization of the client and search strategies and leads to a superior user experience. In addition these log entries serve as an audit trail in case there are any issues from users with their account or transactions.

Figure 8:
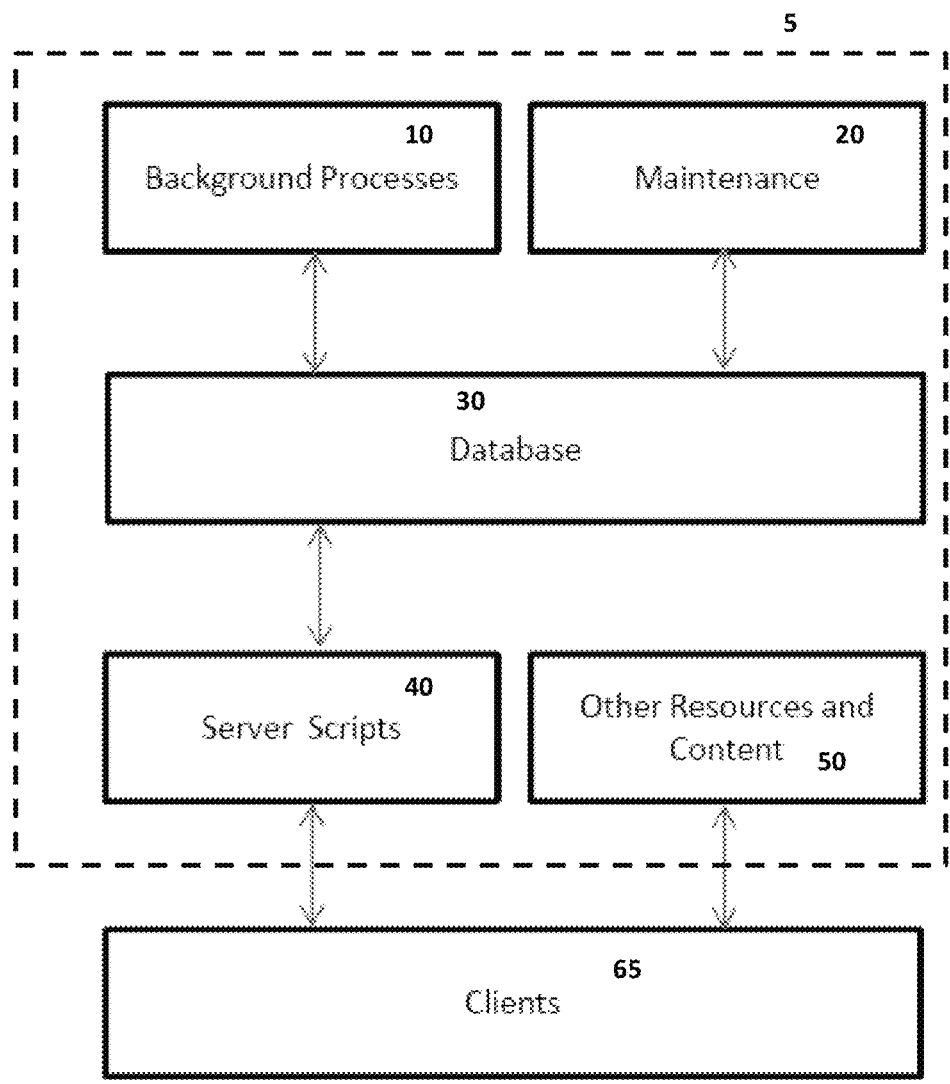
FIG. 8 is a schematic architecture diagram.

FIG. 8 schematically illustrates an example of the system architecture. In FIG. 8, a number of background processes 10 are provided which maintain a database 30, which is the backbone which stores all data objects, in view of events such as expired bids, reverse sales or reserved items that weren't checked out. The background processes also include all data analytics.

A maintenance part 20 deals mainly with maintenance of the data objects that are used as the basis for the website. Examples are the creation of vouchers, maintaining the tree descriptions and images, nursery data and inventory upload.

Server scripts 40 are provided to form a layer which provides the interface for the clients in order to interact with the database—for example by retrieving and storing data objects which are persistent.

Other resources and content 50 are also provided. Some of the content may come from independent sources such as the Treepedia and the TreeBlog (News).

Clients 60 form a front end that runs in web browsers on client device 65. As can be seen from FIG. 8, the background processes 10, the maintenance part 20, the database 30, the server scripts 40, and other resources and content 50 may be implemented on a server apparatus 5. The server apparatus 5 is able to communicate with the client devices 65 via requests (from the client device 65 to the server apparatus 5) and replies (from the server apparatus 5 to the client device 65).

Figure 15:
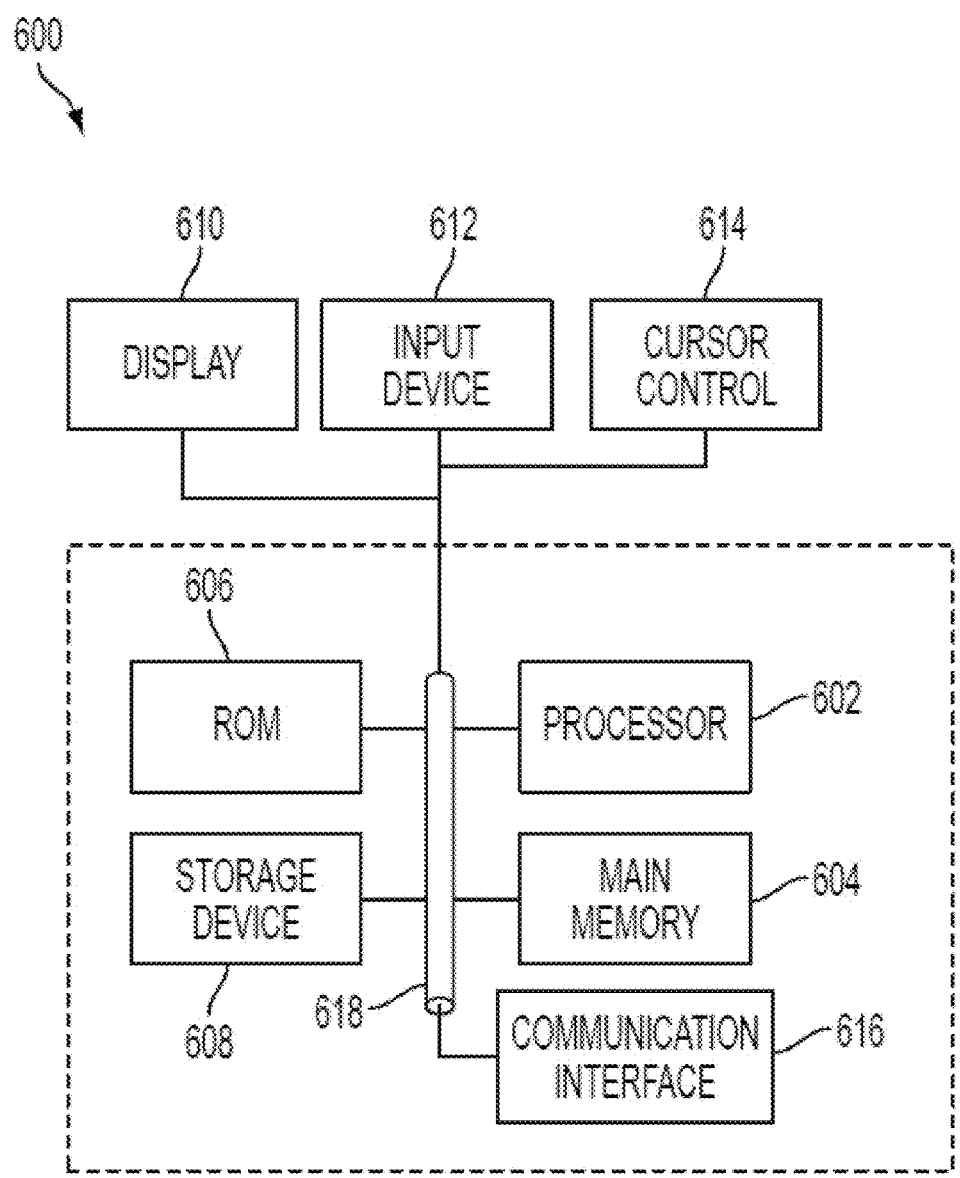
FIG. 15 schematically illustrates the embodiment of a computer system on which various embodiments of the invention may be implemented.

FIG. 15 illustrates an embodiment of a computer system 600 on which various embodiments of the invention may be implemented such as, for example, the server apparatus 5 or the client device 65 of FIG. 8. The computer system 600 may be a physical system, virtual system, or a combination of both physical and virtual systems. In the implementation, a computer system 600 may include a bus 618 or other communication mechanism for communicating information and a processor 602 coupled to the bus 618 for processing information. The computer system 600 also includes a main memory 604, such as random-access memory (RAM) or other dynamic storage device, coupled to the bus 618 for storing computer readable instructions by the processor 602.

The main memory 604 also may be used for storing temporary variables or other intermediate information during execution of the instructions to be executed by the processor 602. The computer system 600 further includes a read-only memory (ROM) 606 or other static storage device coupled to the bus 618 for storing static information and instructions for the processor 602. A computer-readable storage device 608, such as a magnetic disk or optical disk, is coupled to the bus 618 for storing information and instructions for the processor 602. The computer system 600 may be coupled via the bus 618 to a display 610, such as a liquid crystal display (LCD) or a cathode ray tube (CRT), for displaying information to a user. An input device 612, including, for example, alphanumeric and other keys, is coupled to the bus 618 for communicating information and command selections to the processor 602. Another type of user input device is a cursor control 614, such as a mouse, a trackball, or cursor direction keys for communicating direct information and command selections to the processor 602 and for controlling cursor movement on the display 610. The cursor control 614 typically has two degrees of freedom in two axes, a first axis (e.g., x) and a second axis (e.g., y), that allow the device to specify positions in a plane.

The term "computer readable instructions" as used above refers to any instructions that may be performed by the processor 602 and/or other component of the computer system 600. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 608. Volatile media includes dynamic memory, such as the main memory 604. Transmission media includes coaxial cables, copper wire, and fiber optics, including wires of the bus 618. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 602 for execution. For example, the instructions may initially be borne on a magnetic disk of a remote computer. The remote computer can load the instructions into its dynamic memory and send the instructions over a telephone line using a modem. A modem local to the computer system 600 can receive the data on the telephone line and use an infrared transmitter to convert the data to an infrared signal. An infrared detector coupled to the bus 618 can receive the data carried in the infrared signal and place the data on the bus 618. The bus 618 carries the data to the main memory 604, from which the processor 602 retrieves and executes the instructions. The instructions received by the main memory 604 may optionally be stored on the storage device 608 either before or after execution by the processor 602.

The computer system 600 may also include a communication interface 616 coupled to the bus 618. The communication interface 616 provides a two-way data communication coupling between the computer system 600 and a network. For example, the communication interface 616 may be an integrated services digital network (ISDN) card or a modem used to provide a data communication connection to a corresponding type of telephone line. As another example, the communication interface 616 may be a local area network (LAN) card used to provide a data communication connection to a compatible LAN. Wireless links may also be implemented. In any such implementation, the communication interface 616 sends and receives electrical, electromagnetic, optical, or other signals that carry digital data streams representing various types of information. The storage device 608 can further include instructions for carrying out various processes for image processing as described herein when executed by the processor 602. The storage device 608 can further include a database for storing data relative to same.

It will be appreciated that, in the context of an implementation of a server device, the processor 602, the main memory 604, the communication interface 616, the ROM 606 and the storage device 608 are the key components, although the display 610, input device 612 and cursor control 614 may also be provided. In the context of an implementation of a client device, the processor 602, the main memory 604, the communication interface 616, the ROM 606 and the storage device 608, the display 610, input device 612 and cursor control 614 are all generally required in order that a user of the client device is able to interact with the client device to cause it to access the server device to obtain the necessary information to implement the above and below described processes.

Offering a Tree to the Market

Figure 1:
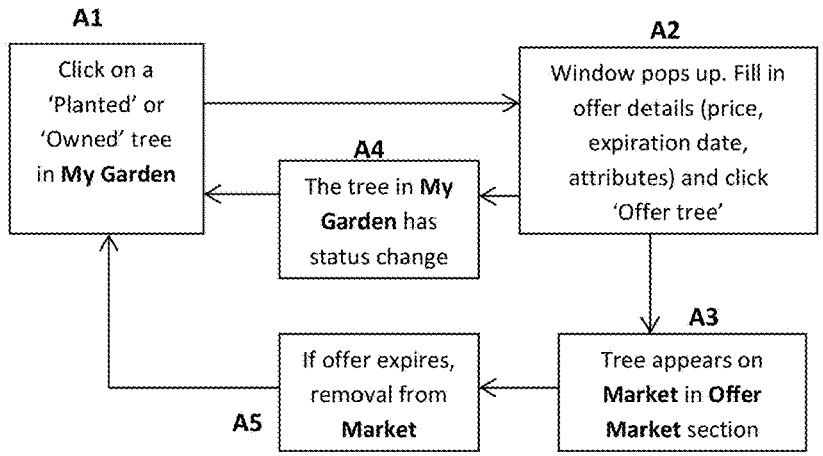
FIG. 1 is a schematic flow diagram of a process for offering a tree on the Market.
Figure 12:
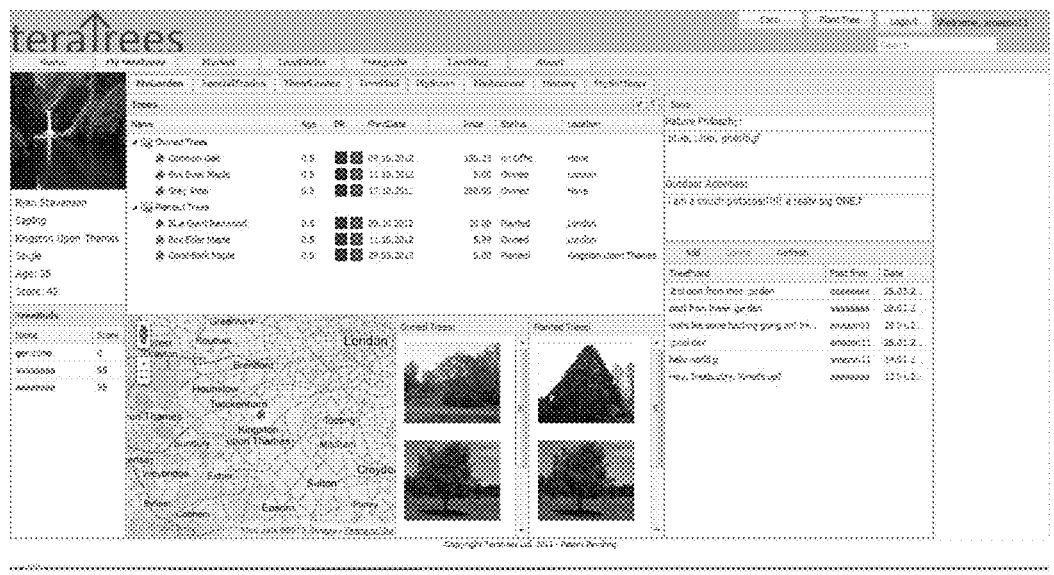
FIG. 12 schematically illustrates an example of the market webpage of the present invention where current offers and bids are presented in separate lists.

At any point a user can decide to offer an owned or planted tree on the market. An example of the Market web page is schematically illustrated in FIG. 12. The Market web page provides search filters both for offers (offer filters) and bids (bid filters). The offer filters include name, location, minimum age and maximum price. The bid filters include date, name and maximum price. The offers which can be made on the offer market are listed, with each entry specifying a name for the tree, a scientific name, age, date of planting, location, identity of the planter, identity of the current owner, bioregion, and price. Each offer can be made by clicking an add to cart button. The current bids which can be accepted are also listed, with each bid entry specifying a date of entry of the bid, the identity of the bidder, the name of the tree and its scientific name, as well as the price associated with the bid. A bid can be accepted by clicking on the accept button. The process followed in this case is schematically illustrated in FIG. 1. In case of a planted tree the user selects a tree from the "My Garden" section of their profile by clicking on the respective row at a step A1. A window with the tree details pops up at a step A2. Besides the option to edit some attributes of the tree (size, name) the window contains fields that deal with offering the tree on the market. The user has to decide on a price (minimum is x Teras) and an expiration date. Both values can be changed in the future at any time as long as the tree is not owned by someone else. The status of the tree changes which signals that this tree is now on the market. Selecting the button 'Offer tree on market' completes this transaction and closes the pop-up window. The tree appears on the Market in the "Offer Market" section at a step A3. At the same time the garden is refreshed and the status of the tree changes to 'on offer' at a step A4. When a tree 'on offer' reaches its expiration date, the data in conjunction with the offer will be reset at a step A5 and the offer of the tree will be removed from the Market. The status will be set to 'planted' automatically on the server database. The user will get a message in regard to this activity.

In case a user decides to offer a tree from the 'owned' section of his/her garden, the process is very similar except that such a tree may internally get a slightly different status which when viewed on the outside by a user is also 'on offer'.

When the pop-up window appears upon selection of a tree entry, one will notice that there is a slight restriction on the maintenance of tree details when a tree is owned (e.g. size). This is because certain details relate specifically to the physical tree, which is maintained only by the planter, not by the owner of the virtual version of the tree.

Owning a Tree on the Market

Figure 2:
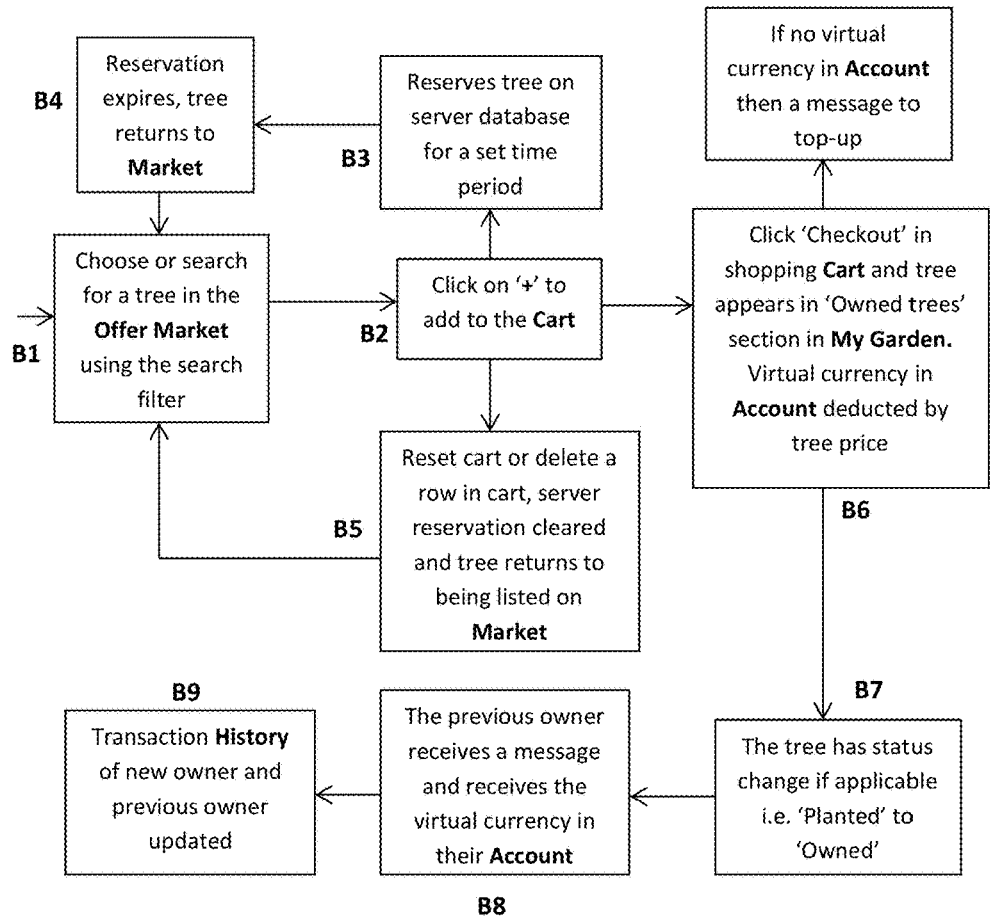
FIG. 2 is a schematic flow diagram of a process for obtaining ownership of a tree on the Market (buying a normal offer)

Should a user wish to purchase a virtual tree, then the process followed is schematically illustrated in FIG. 2. At a step B1, the user is able to choose or search for a tree in an "Offer Market" using a search filter. While looking at the market, the user gets details about the tree when moving the mouse over the particular tree entry which shows a thumbnail image of the tree including other details not shown in the entry. The layout of the list provides options to show/hide columns, re-order the columns and sorting the list by any column.

When a user wants to own a tree from the market, the user adds the tree to the cart at a step B2, which changes the status of the selected tree to 'reserved' on the server database at a step B3, which prevents this tree from being selected and owned by another user for a set time period. The tree entry is also automatically removed from the market view. The cart symbol on the top of the screen changes its counter accordingly.

This enables the user to continue shopping and adding more trees to the shopping cart. The user is able to look at the shopping cart at any point and maintain the cart items. The lifecycle of the cart is limited to the current user session which ends through a logout or the termination of the current browser window at a step B4. In other words, the step B4 causes the reservation to expire, and returns the tree to the Market.

Maintaining the shopping cart enables the user to remove certain items from the cart or emptying the cart at once at a step B5. Each removal or the complete emptying will remove any reservations of such trees on the server database and will return such trees to the market.

In order to prevent trees from being 'reserved' indefinitely a server-based process is used to monitor the status of trees on the market and will send reminders to users about trees they have in their cart for a longer period and which would be returned to the market if the user does not check out within a certain time frame. Otherwise, the reservations will be removed automatically.

When a user enters his/her cart and checks out at a step B6, the reserved trees will be added to the users 'owned' trees list and displayed in that user's "My Garden". The account will be debited (using the virtual currency) according to the prices from the market. During the checkout the system verifies whether the user has sufficient funds to purchase the trees. In the negative case the user will get a message and has the option to remove trees from the cart until the account funds are sufficient or to top up his/her account. At a step B7 the tree has a status change if applicable—for example to change its status from "Planted" to "Owned" if it is the first time that the virtual tree has been sold. Upon successful checkout the planter's or prior user's accounts will be debited at a step B8 and the previous owner receives a message and receives the virtual currency in their account.

Each transaction is posted immediately and shows up in the account history of all involved users at a step B9. The usage of unique transaction IDs enables permanent data consistency and higher user safety.

Adding a Bid to the Market

Figure 3:
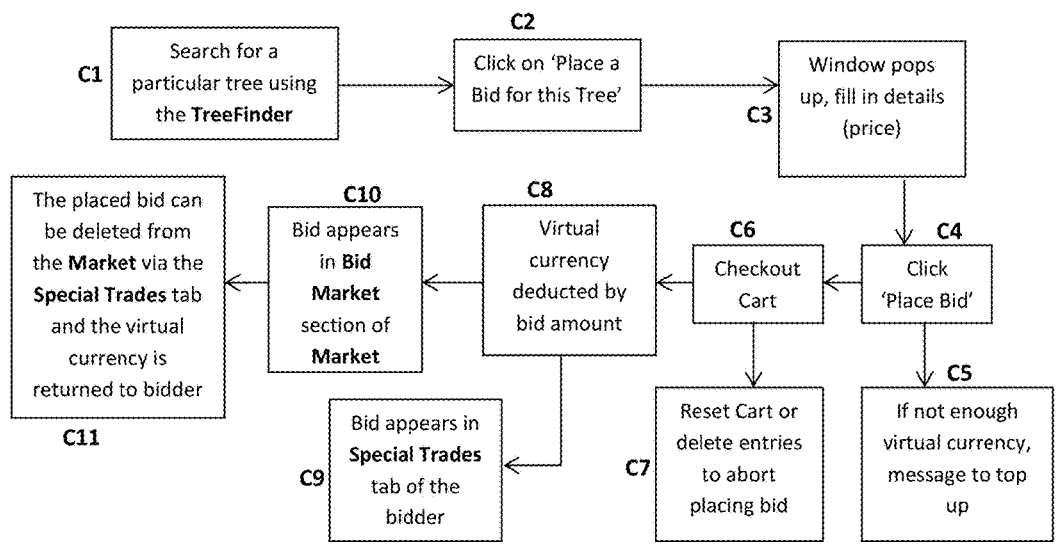
FIG. 3 is a schematic flow diagram of a process for placing a bid on the Market.

If a user wishes to own a certain type of tree and isn't able to find that kind of tree on the market, the website offers the option to place a bid for a certain tree type on the market. The process carried out in this case is schematically illustrated in FIG. 3. First, at a step C1 the user searches for a particular tree. This function is part of the TreeFinder, which provides the user with all necessary options to identify the requested tree type. Based on the details and images of the respective tree type the user can verify his/her request.

At a step C2, the user selects "Place a bid", which leads to a pop up window being displayed at a step C3 which enables the user to enter details such as the bidding price and an expiration date for the bid. The user then clicks "Place Bid" at a step C4. At a step C5, if the user does not have enough virtual currency, a message is generated requesting the user to top up their virtual currency. If sufficient funds are available, a checkout cart is used at a step C6 to make the purchase. At a step C7 the cart can be reset or entries deleted in order to abort placing the bid. However, once the cart is checked out then a bid is made as a binding offer and results in immediate debiting of the users account by the bid amount at a step C8. Placement of such a bid posts a transaction which shows in the account history of the bidder. The placed bid appears in the Special Trades tab of the user at a step C9.

The bid will be immediately visible on the market at a step C10. After reaching the entered expiration date the bid will be automatically removed from the market at a step C11 and the bid amount will be credited to the respective user's account. This transaction will also be posted and appear in the user's account history. The placed bid can therefore be deleted from the Market via the Special Trades tab and the virtual currency returned to the bidder.

Accepting a Bid on the Market

Figure 4:
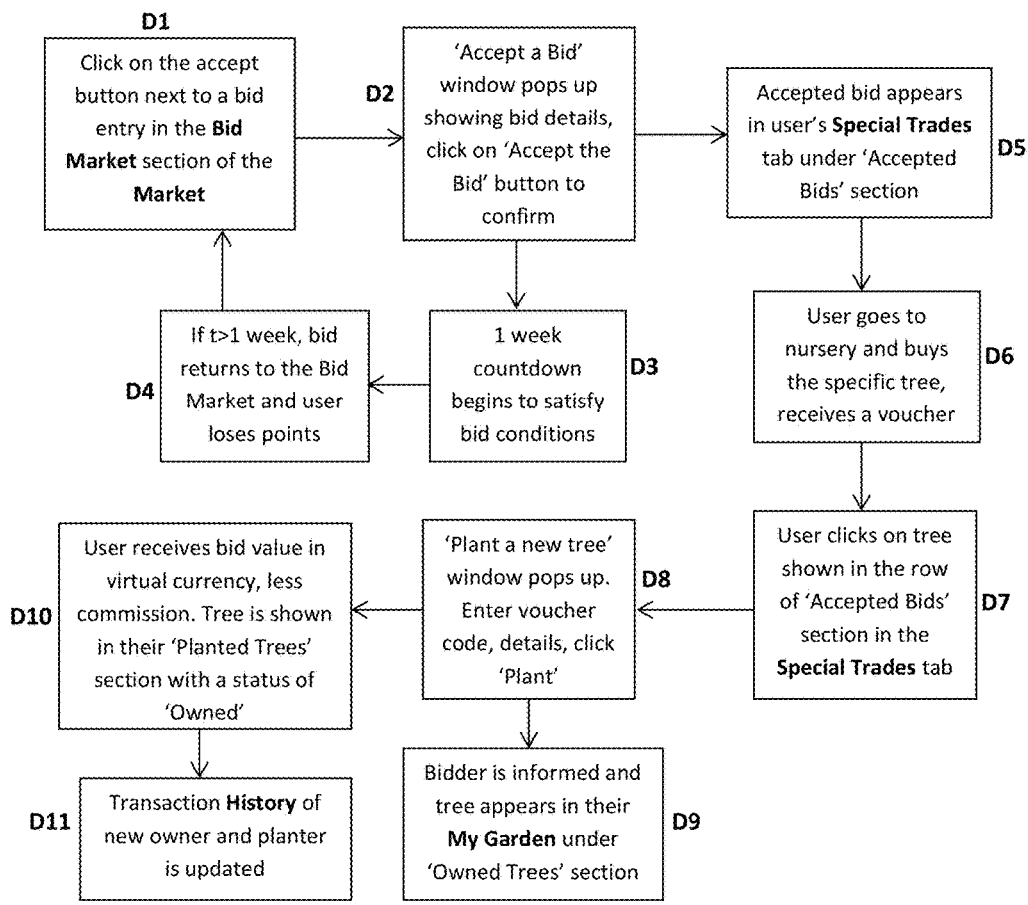
FIG. 4 is a schematic flow diagram of a process for accepting a bid on the Market.

When a user sees a bid on the market it can be accepted at any time. The process conducted in this case is schematically illustrated in FIG. 4. The user is able to accept the bid by clicking on an accept button next to a bid entry in the Bid Market section of the Market at a step D1. An "Accept a Bid" window then pops up at a step D2, showing bid details. The user can then confirm the acceptance of the bid in view of the displayed bid details by clicking on an "Accept the bid" button. Accepting a bid means that the user will become a planter and promises to plant the respective tree type as described in the bid. This planter has 7 days to fulfil this promise. In particular, following the step D2, a step D3 begins a 1 week countdown for the user to satisfy the bid conditions. At a step D4, if more than 1 week elapses without the bid conditions being fulfilled then the bid returns to the bid market and the defaulting user loses points. After acceptance on the market, the bid will be removed and show up in the Special Trades tab of the prospective planter at a step D5. The planter can review the details of accepted bids at any time.

Upon acceptance of a bid the user who placed the bid will receive a notification via TreeMail. The planter will also receive a message via TreeMail which also reminds him to buy from a participating nursery and to assure that he receives a voucher at the check out of the nursery. Towards the end of the fulfilment period reminder messages will be sent to the planter. The planter can use the TreeFinder to find a nursery near him who is supplying such a tree. The user can then go to the nursery at a step D6 and buy the specific tree, and receive a voucher from the nursery confirming the tree purchase.

The planting of the tree (i.e. fulfilling the accepted bid) is initiated from the Special Trades tab and is similar to the regular planting process. Upon selecting the 'Plant Tree' button from the bid section of the Special Trades tab list at a step D7 a pop up window appears at a step D8 and asks the planter to enter certain details (nursery, height, image, voucher code) and the confirm the entries. Upon successful planting the planted tree will appear in MyGarden (status 'owned') of the planter and in the MyGarden of the owner at a step D9. The amount from the bid will be credited to the planters account at a step D10 and the transaction can be reviewed in the account history. The transaction history of the new owner and planter is updated at a step D11 following the step D10. The credit amount will be received as the bid value in virtual currency less commission. The user who placed the bid will be notified via TreeMail upon successful completion of the planting.

Upon planting of the tree, the planter acknowledges that he purchased the requested type of tree from the nursery he stated and that he planted the tree. Through entry of the voucher code the system can validate the nursery against the voucher code database. Teratrees reserves the option to confirm the purchase of the respective tree type with the nursery stated.

In the case of the user who accepted a bid and did not fulfil the requirements in the time period, the bid will return to the market (assuming that the expiration date has not been reached) and will be again available for all users. The prospective planter who did not fulfil the promise to plant the requested tree will be penalized (negative scoring points). For multiple failed bids there will be the option of further penalties.

Adding a Reverse Sale to the Market

Figure 5:
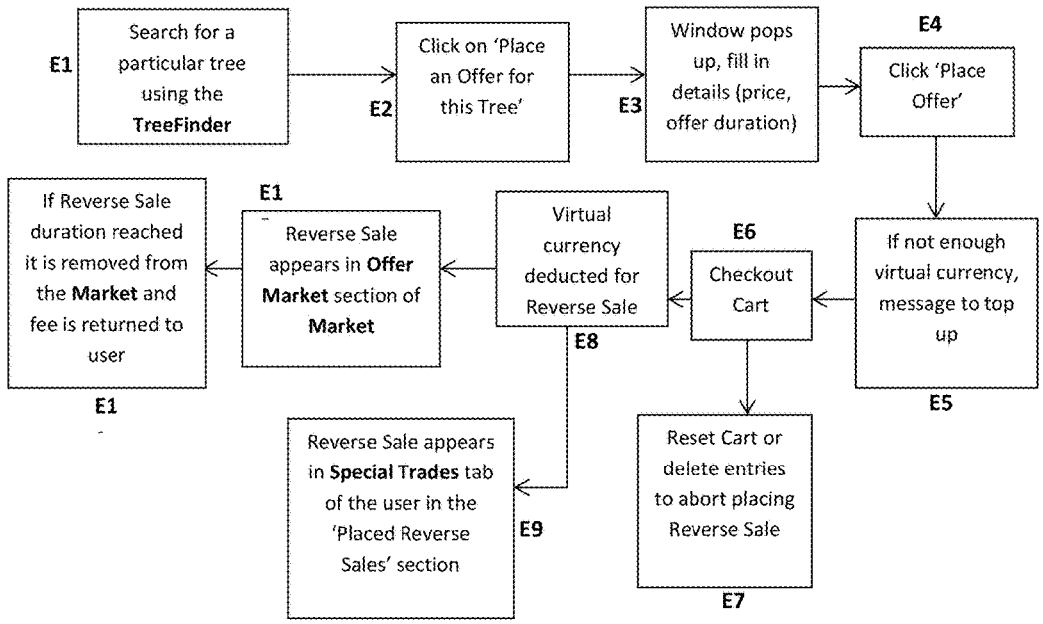
FIG. 5 is a schematic flow diagram of a process for placing a reverse sale on the Market.

A reverse sale is an offer initiated by the planter who plans to plant a certain type of tree in his/her garden and is already looking for a prospective owner before the actual planting. The process carried out in this situation is schematically illustrated in FIG. 5. In such a case the planter looks up the type of tree through the TreeFinder at a step E1, and places an offer for the found tree by clicking on the button 'Place an Offer for this Tree' at a step E2. A popup window then appears at a step E3 which requires the details of price and the duration of the offer to be inputted by the user. At a step E4, once the details have been entered, the user clicks "Place Offer" in the popup window. Then, if the user has insufficient virtual currency (for the small initial fee required), an error message is displayed to the user requesting that he top up his virtual currency. At a step E6, a checkout cart is used to conduct the actual purchase. At a step E7 the cart can be reset or amended by deleting entries if necessary to abort the placing of a reverse sale. Otherwise, at a step E8 the virtual currency is deducted from the user's account for the reverse sale fee.

These offers then show up under the Offers section in the Special Trades tab of the user at a step E9, and in the market where they are visible to all users at a step E10. Similar to regular offers, these reverse sales have a price tag and an expiration date. In particular, if the reverse sale duration as specified by the expiration date is reached then the offer is removed from the market and the small fee is returned to the user. It will therefore be understood that, upon placement of the reverse sale an administrative fee will be charged to the planter's account which will be reimbursed upon successful completion of this transaction (i.e. another user opted into the reverse sale and the planter successfully completes the planting process).

The planter can review and modify his offers at any time before expiration or acceptance by another user.

Accepting a Reverse Sale on the Market

Figure 6:
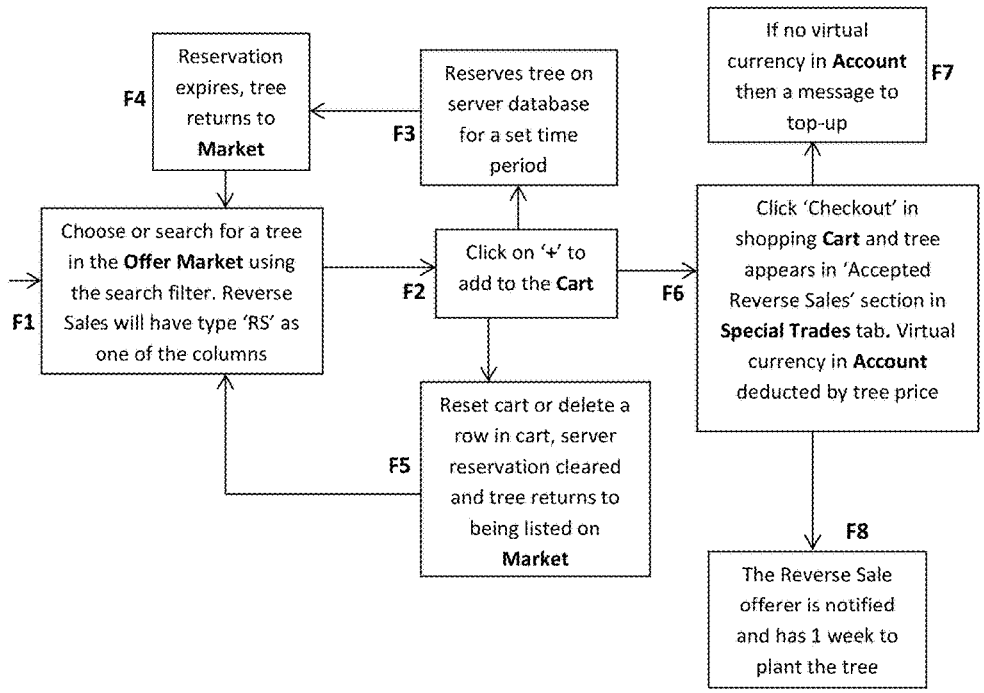
FIG. 6 is a schematic flow diagram for buying a reverse sale on the Market.

Similar to regular offers, these reverse sales are visible on the market and can be added to a user's cart. This process is schematically illustrated in FIG. 6. At a step F1, the user is able to choose or search for a tree in the Offer Market using the search filter. Reverse sales may be identified by having a type "RS" or similar in one of the columns of the search results. At a step F2, the user clicks to add a desired item to the cart. This causes, at a step F3, the added item to be reserved on the server database for a set time period. If at a step F4 the reservation expires, the tree is returned to the Market. The cart can be reset or amended (for example by deleting a row) at a step F5, such that the server reservation is cleared and the tree returns to being listed on the Market. Otherwise, at a step F6 the user clicks "Checkout" in the shopping cart and the tree then appears in "Accepted Reverse Sales" section in the Special Trades tab. The price of the tree in virtual currency is then deducted from the user's account. It will therefore be appreciated that, as part of the check out process the user's account will be debited and the reverse sale will show up under the Offer section in the Special Trades tab of the user who accepted the offer. At a step F8, the planter will receive a message via TreeMail and shall be informed that another user accepted the offer and that the planter has then 7 days to complete the transaction (i.e. purchasing and planting the respective type of tree that he/she offered to sell).

Figure 7:
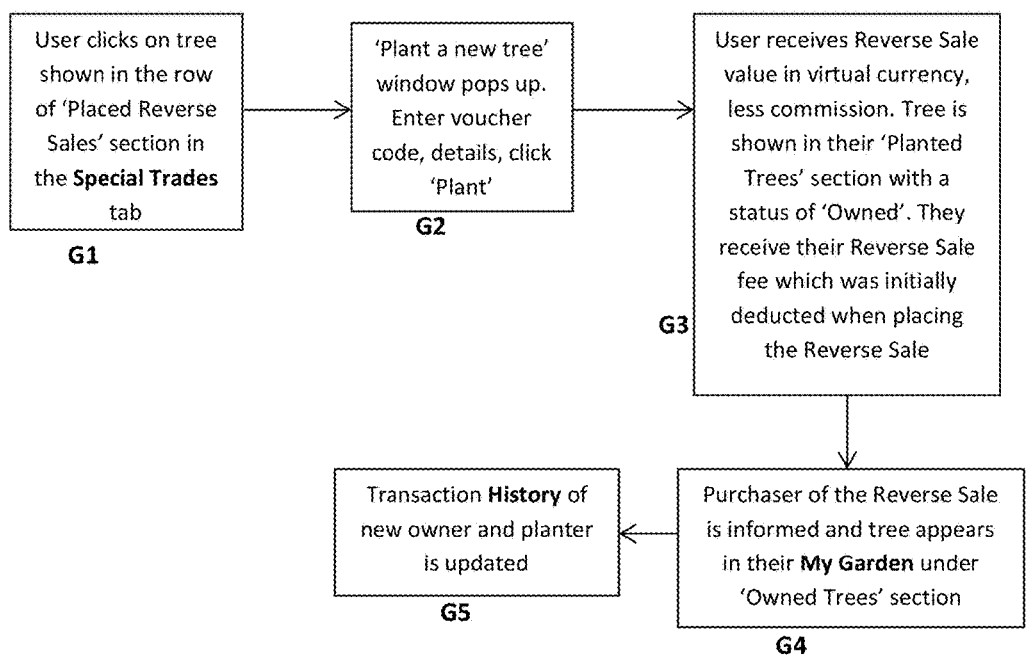
FIG. 7 is a schematic flow diagram for fulfilling a placed reverse sale.

Upon completion of the transaction which is the planting of the tree, the planter's account will be credited with the amount from the offer and the administrative fee shall be reimbursed. The transaction can be reviewed through the account history. This process is schematically illustrated in FIG. 7. At a step G1, the processing of fulfilling a placed reverse sale commences at a step G1, where a user clicks on a tree shown in the "Placed Reverse Sales" section in the Special Trades tab. Then, at a step G2 a "Plant a New Tree" window pops up, permitting the user to enter voucher details (which will have been provided to him by a nursery upon purchase of the tree). Once the voucher details have been entered, the user is able to click "Plant". Then, at a step G3, the user receives the reverse sale value in virtual currency, less commission. The tree is shown in their "Planted Trees" section with a status of "Owned". The user receives their reverse sale fee which was initially deducted when placing the Reverse Sale. At a step G4, the purchaser of the Reverse Sale is informed and the tree appears in their "My Garden" under the "Owned Trees" section. Finally, at a step G5, the transaction history of the new owner and the planter is updated.

Refreshing of the Market

Refreshing the market is accomplished each time a user enters the market or performs any transaction on the market, or by clicking on the refresh button.

Determination of the Order of Market Listings

The listing of offers on the market is driven by the date and time of order placement, i.e. the most recent order is at the top of the list. Within the list the user has the option to sort the list by the columns shown. Extra columns can be made visible through unhiding which would allow further options of sorting.

There are two ways to sort a list which is either 'ascending' or 'descending' based on the ASCII-value of the characters. Technically the user can either double-click on the column header which toggles between the two options or select the orientation by right-clicking on the column header and then selecting the sort direction. What happens when a Tree dies?

Tree death will be reported by the planter via a button on the Tree Popup window of My Garden. Upon clicking on the button a confirmation window pops up and asks the planter to confirm the action while explaining the consequences. From the moment of confirmation the dead tree will be marked accordingly (status=died). In the case that the tree is owned by another user there will a respective message. If the tree is currently on the market is shall be removed.

The Market Filtering Process

In addition to sorting the offers on the market, there are filters to reduce the list and facilitate the search for the users.

The following filters are offered:
Filter by type of tree (English name)
Filter by type of tree (scientific name)
Filter by plant date
Filter by location
Filter by bioregion
Filter by price

The invention claimed is:

1. A method enabling an online marketplace co-ordination of planting of single or multiple physical trees by a third-party user, by means of a virtual connection to other third-party users, via an electronic trading of a virtual object with said other third-party users on said online marketplace, with said other third-party users providing funds for said planting of said physical trees, comprising the steps of:
   (a) providing online marketplace functionality for a first third-party user to search and select a species of tree by means of the common name or the scientific name of the tree, from a list provided by said online marketplace;
   (b) providing online marketplace functionality for said first third-party user to offer a virtual object which represents said tree to said online marketplace at an associated financial value and for a duration of time set by said first third-party user;
   (c) preventing the purchase of said virtual object by other third-party users by said online marketplace if said duration of time has been reached;
   (d) providing online marketplace functionality for the purchasing of said virtual object by a second third-party user, from said online marketplace;
   (e) providing subsequent notification to said first third-party user that said virtual object has been purchased;
   (f) providing a time limit to said first third-party user to physically plant said tree represented by said virtual object;
   (g) providing online marketplace functionality for said first third-party user to upload a digital photograph of said physically planted tree to said online marketplace;
   (h) providing online marketplace functionality for said first third-party user to enter a voucher code matching a voucher code stored by said online marketplace within said time limit;
   (i) providing online marketplace functionality for the physically planted tree to be deemed as virtually planted once said first third-party user has uploaded a digital photograph of said physically planted tree to said online marketplace and entered a matching voucher code to said marketplace;
   (j) holding of said financial value of said virtual object by said online marketplace until said physically planted tree is virtually planted;
   (k) notifying said second third-party user that said virtual object has been physically planted;
   (l) appearing of said virtual object on an online personal profile of said second third-party user as a virtual object virtually owned by said second third-party user, after said physically planted tree is virtually planted;
   (m) transferring said financial value or a part thereof, to said first third-party user once said physically planted tree has been virtually planted.

2. The method of claim 1, further comprising the use of a virtual currency for electronic trading of said virtual object.

3. The method of claim 1, further providing online marketplace functionality for said first third-party user to provide an age and a height of said physically planted tree to said online marketplace, in order for said physically planted tree to be deemed as virtually planted.

4. The method of claim 1, further comprising charging a variable financial value fee to said first third-party user to offer said virtual object to said online marketplace.

5. The method of claim 4, further comprising returning said variable financial value fee to said first third-party user once said tree represented by said virtual object has been deemed as virtually planted.

* * * * *